United States Patent [19]

Vanassche et al.

[11] Patent Number: 4,650,068

[45] Date of Patent: Mar. 17, 1987

[54] REINFORCING STRUCTURE FOR ELASTOMERIC ARTICLE AND ARTICLE THEREBY OBTAINED

[76] Inventors: Roger Vanassche, Paul Ferrardstraat 8d; Germain Verbauwhede, Kanaalstraat 84, both of 8550 Zwevegem, Belgium

[21] Appl. No.: 767,706

[22] Filed: Aug. 22, 1985

Related U.S. Application Data

[63] Continuation of Ser. No. 500,369, Jun. 2, 1983, abandoned.

[30] Foreign Application Priority Data

Jun. 14, 1982 [NL] Netherlands .......................... 8202410

[51] Int. Cl.$^4$ ............................................... B65G 15/34
[52] U.S. Cl. ...................................... 198/847; 139/419; 139/425 R; 428/257; 474/271
[58] Field of Search ................. 198/847, 846; 474/261, 474/267, 271; 428/113, 257; 139/419, 425 R; 245/2, 8

[56] References Cited

U.S. PATENT DOCUMENTS

| | | | |
|---|---|---|---|
| 928,196 | 7/1909 | Herald | 245/8 |
| 2,052,808 | 9/1936 | Spokes | 139/419 |
| 2,515,778 | 7/1950 | Knowland | 474/271 X |
| 3,249,128 | 5/1966 | Lord | 474/261 X |
| 4,064,915 | 12/1977 | Buyssens et al. | 198/847 X |

FOREIGN PATENT DOCUMENTS

| | | | |
|---|---|---|---|
| 1028859 | 5/1966 | United Kingdom | 198/847 |
| 1082684 | 9/1967 | United Kingdom | 139/419 |
| 929508 | 5/1982 | U.S.S.R. | 198/847 |

Primary Examiner—Joseph E. Valenza
Assistant Examiner—Jonathan D. Holmes
Attorney, Agent, or Firm—Shlesinger, Arkwright, Garvey & Fado

[57] ABSTRACT

A flat reinforcing structure for elastomeric objects such as conveyor belts comprises a first series of parallel cords covered on one side by a second series of parallel cords which with respect to the first series are transversely disposed and whereby the cords are mutually connected at the intersections. The nominal tensile strength of the first series of cords per unit width is at least twice the nominal tensile strength of the second series of cord per unit width. The tensile strength of each cord of the first series is at least one and at most ten times the tensile strength of each of cord of the second series. The cords are preferably steel cords.

26 Claims, 2 Drawing Figures

REINFORCING STRUCTURE FOR ELASTOMERIC ARTICLE AND ARTICLE THEREBY OBTAINED This application is a continuation, of application Ser. No. 500,369, filed 6/2/83, now abandoned.

The invention relates to a flat reinforcing structure for an elastomeric object, in particular a conveyor belt. This reinforcing structure comprises a first series of parallel cords, as well as a second series of parallel cords which, relative to the first series, extend in the transverse direction, both series being connected at the intersections.

BACKGROUND OF THE INVENTION

It is known to use in conveyor belts reinforcing fabrics in which the warp wires or cords are disposed lengthwise of the belt so providing the required longitudinal strength, whereas the weft wires or cords provide the belt with adapted transverse stiffness while increasing its impact resistance and resistance against lengthwise cracks.

In use it often occurs that relatively heavy pieces of material are cast onto the belt so that it must possess a substantial resistance against impact loading. It may also occur that pieces with sharp edges or corners get stuck between the belt surface and the driving elements or the frame of the conveyor. Such sharp edges or corners may produce incisions extending lengthwise of the progressing belt. In the worst case, the incision or crack may extend crosswise through the conveyor belt thickness so damaging the latter irrepairably and rendering it useless. To prevent this, it was already proposed in the past to introduce transverse cords in the reinforcing structure which prevent local damage from propagating into longitudinal cracks.

In order to retain optimal flexibility of the conveyor belt, so that it can move around guiding wheels with relatively small diameters, preferably no more than one reinforcing structure will be applied and its thickness will be kept small. In a reinforcing fabric, as described in the European Pat. No. 2299 in name of Applicant, which contains substantially straight weft cords, the thickness of the fabric will be almost equal to the thickness of this weft cord plus twice the thickness of the warp cords extending crosswisely over them. The amount of rubber required to fill the reinforcing zone in the belt between the cords of the fabric is therefore quite large.

SUMMARY OF THE INVENTION

According to the invention it is now proposed to reduce this fabric thickness down to the thickness of the weft cord plus only once the thickness of the warp cord. It is also proposed, taking account of the required flexibility of the reinforced elastomeric object (in particular the troughability of a reinforced conveyor belt), to improve the impact resistance by maintaining a given elasticity and tensile strength ratio between the two series of intersecting cords and by adapting the spacings between the cords in each series in a special manner. The tensile strength of the first series of cords per unit of width of the series (N/mm) must therefore amount to at least twice the tensile strength of the second series of cords per (same) unit of width, while the tensile strength of each cord of the first series is at most ten times and at least once the tensile strength of each cord of the second series.

Preferably the first series of cords will possess an elongation at fracture of between 2.5% and 7.5%, while that in the second series will amount to at least 3%, for example between 5% and 12%.

Steel cords provided with a coating stimulating adhesion to rubber, as eg. brass containing 67% Cu and 33% Zn are particularly suited. If the reinforced object is a conveyor belt, then the cords of the first series will be disposed lengthwise (running direction) of the belt.

DESCRIPTION OF THE DRAWINGS

A few embodiments of the invention will now be further clarified whereby reference is made to the drawings in which.

DESCRIPTION OF THE INVENTION

Figure 1:
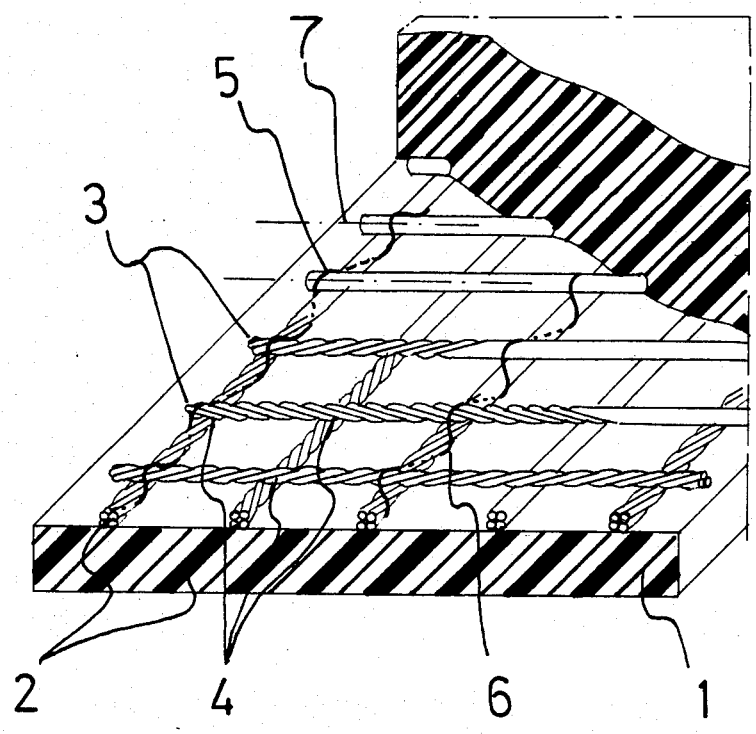
FIG. 1 is a perspective view of a reinforcing structure embedded in an elastomeric strip.

The elastomeric strip 1 contains the reinforcing structure comprising a first series of parallel longitudinal cords 2 over which a second series of parallel transverse cords 3 is disposed. Both series are mutually connected at the intersections 4, eg by means of the binding wire or binding yarn marked 5 or 6. The binding yarn 6 may follow a binding pattern whereby it extends diagonally across the cord intersection or perpendicularly to one of the cord series such as the binding wire 5 which extends perpendicularly to the transverse cords 3. This last embodiment deserves preference.

It is evident that also other known connecting methods are possible. The connection of the two cord series is done on a suitable weaving installation where the longitudinal cords are fed in at suitable spacings, while the transverse weft cords are disposed one by one at the required distance on the longitudinal cords and fixed to each other at the intersections by means of a binding yarn in a known sewing operation.

In the following table a few geometric parameters of reinforcing structures for various strength categories (N/mm) of conveyor belts are given as an example of suitable embodiments of the invention. The reinforcing cords in both series are brass coated steel cords. The binding yarn is a nylon yarn of 940 dtex provided with a coating stimulating the adhesion to the elastomer and having a breaking strength of 65 N. A(4×7×0.25)-cord construction in the table means that the cord comprises 4 twisted strands in which each strand comprises 7 twisted round steel filaments each having a diameter of 0.25 mm. As known, lay length and direction in both the cord and the strand govern the elongation behaviour.

| | | | |
|---|---|---|---|
| Longitudinal strength of conveyor belt (N/mm) | 500 | 1000 | 2000 |
| Transverse strength (N/mm) | 125 | 250 | 500 |
| Thickness of the structure (mm) | 3.60 | 4.00 | 6.00 |
| Longitudinal cords of construct. | | 4 × 7 × 0.25 | 4 × 7 × 0.45 |
| Cord diameter (mm) | | 2.05 | 3.6 |
| Breaking strength (N) | | 3,200 | 10,000 |
| Elongation at fracture (%) | | 5 | 6.6 |
| Elongation at 10% of breaking strength (%) | | 1.8 | 2.2 |
| Number of cords per m of strip width | 172 | 344 | 215 |
| Transverse cord construction | 3 × 7 × | 4 × 7 × | 4 × 7 × |

|  | -continued | | |
| --- | --- | --- | --- |
|  | 0.22 | 0.25 | 0.30 |
| Cord diameter (mm) | 1.52 | 1.93 | 2.32 |
| Breaking strength (N) | 1710 | 2775 | 3880 |
| Elongation at fracture (%) | 7.5 | 7.5 | 7.5 |
| Number of cords per m of (a) | 80 | 100 | 90 |
| strip length (b) | 40 | 50 | 45 |

This table shows that for conveyor belts in the strength category 500 N/mm to 2000 N/mm, the tensile strength (in Newton-N-) of each longitudinal cord (first series) amounts to at most 3×the tensile strength of each transverse cord (second series). This limit of tensile strength ratio also applies to conveyor belts in the strength categories 200 N/mm to 500 N/mm.

The distance between the central axes 7 of two successive cords in the second series is more than half said distance between two successive cords in the first series. Preferably, however, the ratio between these distances is at most 7. Preferably, in the reinforcing structures for conveyor belts in the strength categories 200 N/mm to 2000 N/mm, the ratio between said central axis distances will be greater than 2.

In view of reaching a favourable impact resistance, the number of cords of the second series per m of width of this series will be selected between approximately 40 and approximately 200. For conveyor belts in the strength category 200 N/mm to 2000 N/mm this number of cords will vary between approximately 40 and 100. The reinforcing structure according to the invention has the important advantage that the elongation capacity, in both the longitudinal and the transverse direction, depends only upon the intrinsic elongation capacity of the cords and is not influenced by the connecting or weaving process of the two cord series. The suggestion to use rectilinear longitudinal cords also permits more rigid longitudinal cords (with a greater thickness) to be utilized in the structure than a normal weaving process would permit and whereby the shuttles would have to overcome a cord deformation force in order to introduce the weft cords.

The conventional weaving of relatively thick steel cords would therefore require particularly sturdy and heavy weaving looms. Although the table lists only structure strengths up to a strength of 2000 N/mm, it has now become possible according to the invention to design, in principle, reinforcing structures for heavier conveyor belts, for example, up to 7100 N/mm with longitudinal cord having a construction of, for example, 7×7 or 7×12 or 7×19 or 7×31 and a cord diameter varying between approximately 2 mm and approximately 14 mm. However, the transverse cords would substantially raise the impact strength of these conveyor belts.

In order to improve the rubber penetration (and hence the corrosion resistance) of the reinforcing structure, cord constructions will be used of the type 4×(0.30+6×0.25) instead of 4×7×0.25 for a belt in the strength category 500 N/mm to 1000 N/mm. In each of the four strands the central filament thus has a diameter of 0.30 mm. The six surrounding filaments having a diameter of 0.25 mm and thereby leave some free intermediate spaces which extend helically over the length of the strand and permit a better rubber penetration down to the surface of each core filament having a diameter of 0.30 mm in each of the four strands.

Figure 2:
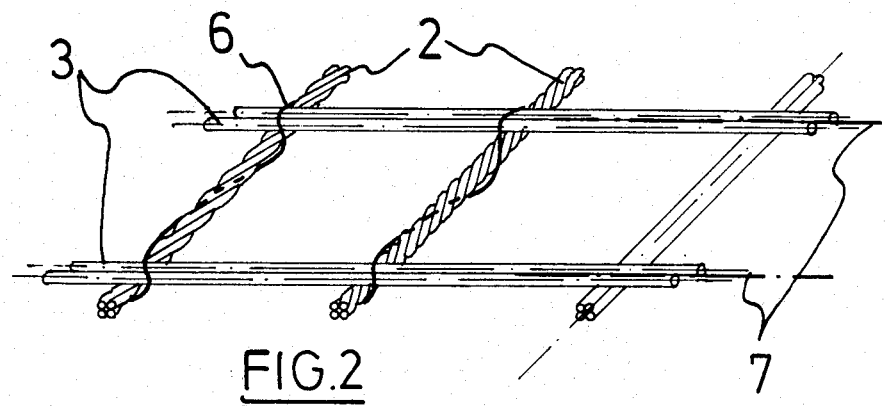
FIG. 2 is a view of a variant of the reinforcing structure.

A variant embodiment is shown in FIG. 2. Here the steel cords 3 of the second series are disposed in pairs. This offers the advantage that the thickness of the reinforcing structure for the same strength of the structure according to the direction of this second series (crosswise to the conveyor belt) is slightly smaller. Also the transverse stiffness will be slightly reduced which is an advantage to the troughability if the reinforced structure is a conveyor belt.

For a belt in the strength category of 1000 N/mm, the dimensioning of the reinforcing structure would offer a suitable impact resistance if, for example, the longitudinal cords 2 would be of the construction 4×7×0.25 (tensile strength 3200 N) and the distance between their central axes would be 2.9 mm, while for the pairwisely disposed transverse cords 3 a construction of 3×7×0.22 can be selected, while the distance between the central axes 7 would then be 12.5 mm or even more.

An additional advantage of the reinforcing structure according to the invention, if used for conveyor belts, concerns the improved suitability for connecting the conveyor belt ends by means of mechanical clamps. These clamps should preferably be hooked behind the transverse cords in the belt ends. For this purpose binding yarns 5 or 6 with high tensile strength, eg up to 650 N, may be used.

Multiplying the number of cords of the second series per m of width of the series by the diameter of these cords offers the density degree of the second series of cords. This can be related to the nominal tensile strength of the first series of cords per unit of width (eg in N/mm) of this first series in order to be able to use a practical dimensioning form of the reinforcing structure. According to the invention it has appeared that the ratio of this nominal tensile strength (N/mm) to the density degree of the second series of cords varies between 3000 and 20,000 N/mm. For conveyor belts in the strength categories 200 N/mm to 2000 N/mm this ratio will vary between 4000 and 16,000 N/mm.

A number of comparative impact tests were conducted, on the one hand, on elastomeric strips reinforced with fabrics according to the European Pat. No. 2299 (weft wires with elongation at fracture greater than 5%), and, on the other hand, on similar elastomeric strips reinforced with structures according to the invention.

Thereby, in the same strength category, a first type of these structures was built from the same type of warp and weft cords and having the same density degrees as those of the comparative fabric according to European Pat. No. 2299. A second type of structure was built according to the foregoing table and with the number of transverse cords per m of strip length according to case (a) in the Table. The impact test was conducted as follows: the reinforced elastomeric strips were placed on two horizontal and parallel steel rollers each having a diameter of 100 mm. The distance between the central axes of these rollers was 300 mm. The reinforced elastomeric strip was tightened according to the direction of the warp cords with a load equal to 10% of the tensile strength of the reinforced strip. The weft cords were disposed on the warp cords and the reinforcing structure was disposed approximately in the center of the elastomeric strip.

The strip had a thickness of 13 mm for the longitudinal strength category 500 N/mm and 14 mm for that of the 1000 N/mm category. The critical impact resistance was determined by dropping a weight perpendicularly onto the reinforced strip on a weft cord which was halfway between the roller supports and from such a height that cord fracture occurred. The impinging weight had a cone-shaped bottom (cone peak angle 90° with a rounded point (curvature radius 5 mm) and weighed either 10 kg or 20 kg. When an impact load was applied which was considerably greater than the critical impact resistance, so that the strip got damaged, then the strip generally showed (apart from the cord fracture) an indentation in the upper surface and a crack in the underside of the strip at the place of impact. This fracture phenomenon corresponds best with fractional impact fractures so that the test is particularly representative of practical circumstances. This test can also be considered as a very severe impact test when compared with an analogous test where the weight drops onto the strip between two weft cords and whereby for the critical impact (cord fracture) much higher values (kgm) are registered.

The weft cords are undoubtedly more vulnerable to impact loads than the usually thicker underlying warp cords. For example, it was noticed that raising the warp cord thickness (in strips in the various strength categories) exerted relatively less influence on the critical impact resistance (warp cord fracture) of the reinforced strip than raising the weft cord thickness. The critical impact resistance (kgm) for the warp cords measured according to the above described test was approximately at the same level for the strips with the first reinforcing structure (in the various strength categories) as in the corresponding strips with the fabrics according to European Pat. No. 2299. The critical impact resistance for the warp cords in the strips with the second reinforcing structure (in the various strength categories) was approximately 1.5×higher than in the corresponding strips with the fabrics according to European Pat. No. 2299.

However, the critical impact resistance (kgm) for the weft cords measured according to the test described above was 3 to 3.5 times higher for the strips with the first reinforcing structure (in the various strength categories) than for the corresponding strips with the fabrics according to European Pat. No. 2299. This clearly illustrates the improved impact behaviour of the structure according to the invention versus the comparable reinforcing fabric according to European Patent. The critical impact resistance of the weft cord for the strips with the second reinforcing structure (in the various strength categories) was in turn between approximately 6× and 9× that of the corresponding strips according to European Pat. No. 2299. Thereby it was also noted that halving the number of weft cords per m of strip length (case b in the Table) reduces relatively little, or even barely the critical impact resistance of the weft cords. In other words, the impact behaviour of the second reinforcing structure with the number of transverse cords according to case (b) is amply satisfactory and offers the advantage of a more economical solution than case (a).

The reinforced elastomeric object in the form of a sheet or plate may comprise one or more reinforcing structures extending parallel to the object surface. If this object is a conveyor belt, usually one reinforcing structure will be sufficient. The thickness of the elastomeric layer at the side of the transverse cords 3 will amount to nearly twice the thickness of the elastomeric layer at the side of the longitudinal cords. The elastomeric layer may evidently comprise the usual rubber compositions and modified rubbers or P.V.C. Obviously, the selected elastomer must offer good adhesion to the reinforcing cord. Moreover, the stiffness and tearing strength of the elastomeric material may be additionally influenced by specific fillers, to be incorporated eg in fiber shape.

The requested protection covers these and other variants, concerning both the geometric and strength parameters of the reinforcing structure itself, the combination of other reinforcing elements in the elastomeric object and application in other objects than conveyor belts as eg in driving belts, container walls and large-diameter hoses.

We claim:

1. A flat reinforcing structure having a warp direction and a weft direction for elastomeric objects, comprising:
   (a) a first series of spaced apart parallel multi-strand steel warp cords arrayed generally in a plane;
   (b) a second series of spaced apart parallel multi-strand steel weft cords, said weft cords generally transverse to said warp cords and disposed along a first side of said plane and engaged with said warp cords at a plurality of intersection points; and
   (c) non-metallic strand means having substantial strength wound about each of said warp cords and about the associated weft cord at each of said intersection points for maintaining said cords in engagement and for providing an elastic fabric.

2. The structure as defined in claim 1, wherein:
   (a) said fabric has a longitudinal strength of between about 200 N/mm to about 2000 N/mm; and,
   (b) said warp cords have a tensile strength not exceeding three times the tensile strength of said weft cords.

3. The structure as defined in claim 2, wherein:
   (a) said weft cords spaced apart a distance exceeding two times the distance separating said warp cords.

4. The structure as defined in claim 1, wherein:
   (a) said second series has between about forty to about 200 weft cords per meter of width.

5. The structure as defined in claim 4, wherein:
   (a) said second series has 100 weft cords.

6. The structure as defined in claim 1, wherein:
   (a) said second series has a density degree equal to the number of cords in said second series per unit width multiplied by the diameter of said weft cords; and,
   (b) said first series has a nominal tensile strength such that the ratio of the nominal tensile strength of said first series to the density degree of said second series is between about 3000 N/mm to about 20,000 N/mm.

7. A structure according to claim 1, wherein:
   (a) said structure has an elongation at fracture between about 5% to about 12% in the weft direction.

8. The structure as defined in claim 1, wherein:
   (a) said structure has a longitudinal strength of between about 200 N/mm to about 2000 N/mm; and
   (b) the ratio of the nominal strength of said first series to the density degree of said second series is between about 4000 N/mm and about 16000 N/mm.

9. The structure of claim 1, wherein:
   (a) said weft cords being spaced apart so that the distance between adjacent weft cords is between about ½ to about 7 times the distance separating adjacent warp cords and the tensile strength per unit width of the structure in the warp direction is at least twice the tensile strength per unit width of the structure in the weft direction;
(b) said warp cords having a tensile strength of between about 1 to about 10 times the tensile strength of said weft cords;
(c) said fabric having an elongation at fracture in the warp direction of about 2.5% to about 7.5%; and,
(d) said fabric having an elongation at fracture in the weft direction of at least 3%.

10. The structure of claim 1, wherein:
(a) said warp and weft cords having associated therewith means for stimulating adhesion to a surrounding matrix.

11. The structure of claim 10, wherein:
(a) said means for stimulating adhesion including a brass coating.

12. The structure of claim 1, wherein:
(a) each of said warp cords including a plurality of twisted together strands.

13. The structure of claim 12, wherein:
(a) free intermediate spaces extend helically along said cords permitting penetration of an elastomer between the strands of said cords.

14. The structure of claim 1, wherein:
(a) said structure being embedded in a resilient matrix.

15. The structure of claim 1, wherein:
(a) said binding means including nylon.

16. A reinforced elastomeric sheet having embedded therein parallel to the surface of the sheet at least one reinforcing structure having a warp direction and having a weft direction comprising:
(a) a first series of spaced apart parallel multi-strand steel warp cords arrayed generally in a plane;
(b) a second series of spaced apart parallel multi-strand steel weft cords, said weft cords generally transverse to said warp cords and disposed along a first side of said plane and engaged with said warp cords at a plurality of intersection points; and,
(c) non-metallic strand means having substantial strength wound about each of said warp cords and about the associated weft cords at each of said intersection points for maintaining said cords in engagement and for providing an elastic fabric.

17. A reinforced elastomeric sheet as in claim 16, wherein:
(a) said elastomeric sheet has a portion above said reinforcing structure and a portion below said reinforcing structure and wherein, the thickness of said portion of said elastomeric sheet above said reinforcing structure amounts to about twice the tickness of said portion of said elastomeric sheet below said structure.

18. The sheet of claim 16, wherein:
(a) said weft cords being spaced apart about ½ to about 7 times the distance separating the warp cords and the tensile strength per unit width of the structure in the warp direction is at least twice the tensile strength per unit width of the structure in the weft direction;
(b) said warp cords having a tensile strength of between about 1 to about 10 times the tensile strength of said weft cords;
(c) said fabric having an elongation at fracture in the warp direction of between about 2.5% to about 7.5%; and,
(d) said fabric having an elongation at fracture in the weft direction of at least 3%.

19. The sheet of claim 16, wherein:
(a) said warp and weft cords each having associated therewith means for stimulating adhesion to a surrounding matrix.

20. The sheet of claim 19, wherein:
(a) said means for stimulating adhesion including a brass coating.

21. The sheet of claim 16, wherein:
(a) each of said warp cords including a plurality of twisted together strands.

22. The sheet of claim 21, wherein:
(a) free intermediate spaces extend helically the length of said cords for permitting penetration of an elastomer between the strands of said cords.

23. The sheet of claim 16, wherein:
(a) said weft cords being disposed in pairs.

24. The sheet of claim 16, wherein:
(a) said binding means including nylon.

25. A conveyor belt including a fabric having a warp direction and a weft direction comprising:
(a) consecutive spaced apart parallel multi-strand steel warp cords extending in said warp direction and arrayed generally in a plane, said warp cords spaced apart a distance A;
(b) consecutive spaced apart parallel multi-strand steel weft cords extending in said weft direction, said weft cords generally transverse to said warp cords and disposed along a first side of said plane and engaged with said warp cords at a plurality of intersection points, said weft cords being spaced apart a distance B;
(c) non-metallic strand means, having substantial strength, wound about each of said warp cords and about the associated weft cord at each of said intersection points, for maintaining said cords in engagement and for making said fabric elastic;
(d) each said warp cord having a tensile strength of between one to about ten times the tensile strength of said weft cords for providing tensile strength and impact resistance for said fabric;
(e) said consecutive warp cords and consecutive weft cords spaced apart a distance so, one half times said distance A is less than or equal to B which is less than or equal to 7 times said distance A;
(f) the tensile strength per unit width of said fabric in the warp direction is at least twice the tensile strength per unit width of said fabric in the weft direction;
(g) said fabric having an elongation at facture in the warp direction of between 2.5% and 7.5%;
(h) said structure having an elongation at fracture in the weft direction of between 5% and 12%;
(i) an elastomeric matrix; and,
(j) said fabric is embedded in said elastomeric matrix such that said plane is parallel to a surface of said matrix.

26. The conveyor belt as in claim 25, wherein:
(a) the side of said matrix associated with said weft cords has a thickness of at least twice the tickness of the side associated with said warp cords.

* * * * *